United States Patent
Miller

(10) Patent No.: US 6,397,274 B1
(45) Date of Patent: May 28, 2002

(54) METHOD AND APPARATUS FOR ANALYZING BUFFER ALLOCATION TO A DEVICE ON A PERIPHERAL COMPONENT INTERCONNECT BUS

(75) Inventor: Steven C. Miller, Livermore, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/409,765

(22) Filed: Sep. 30, 1999

(51) Int. Cl.[7] ................................. G06F 3/00
(52) U.S. Cl. ........................ 710/56; 711/148
(58) Field of Search ..................... 711/148, 170, 711/171, 172, 173; 710/52, 56

(56) References Cited

U.S. PATENT DOCUMENTS 5,581,736 A * 12/1996 Smith ..................... 711/170
5,802,055 A * 9/1998 Krein ..................... 370/402
5,915,104 A    6/1999 Miller .................... 395/309
5,916,309 A * 6/1999 Brown et al. ............ 710/52
6,243,769 B1 * 6/2001 Rooney .................. 710/56

* cited by examiner

Primary Examiner—Hiep T. Nguyen
(74) Attorney, Agent, or Firm—Baker Botts L.L.P.

(57) ABSTRACT

A bridge device (12) in a computer system interconnects with peripheral component interconnect (PCI) devices (14) over a PCI bus (16). The bridge device (12) includes a plurality of read response buffers (10) to provide data to the PCI devices (14). Each of the read response buffers (10) has a plurality of counters/registers (22) associated therewith. The counters/registers (22) measure various parameters associated with the request and retrieval of requested data and speculative data through the read response buffers (10). In response to the parameters measured by the counters/registers (22), the read response buffers (10) can be optimally allocated among the PCI devices (14).

15 Claims, 1 Drawing Sheet

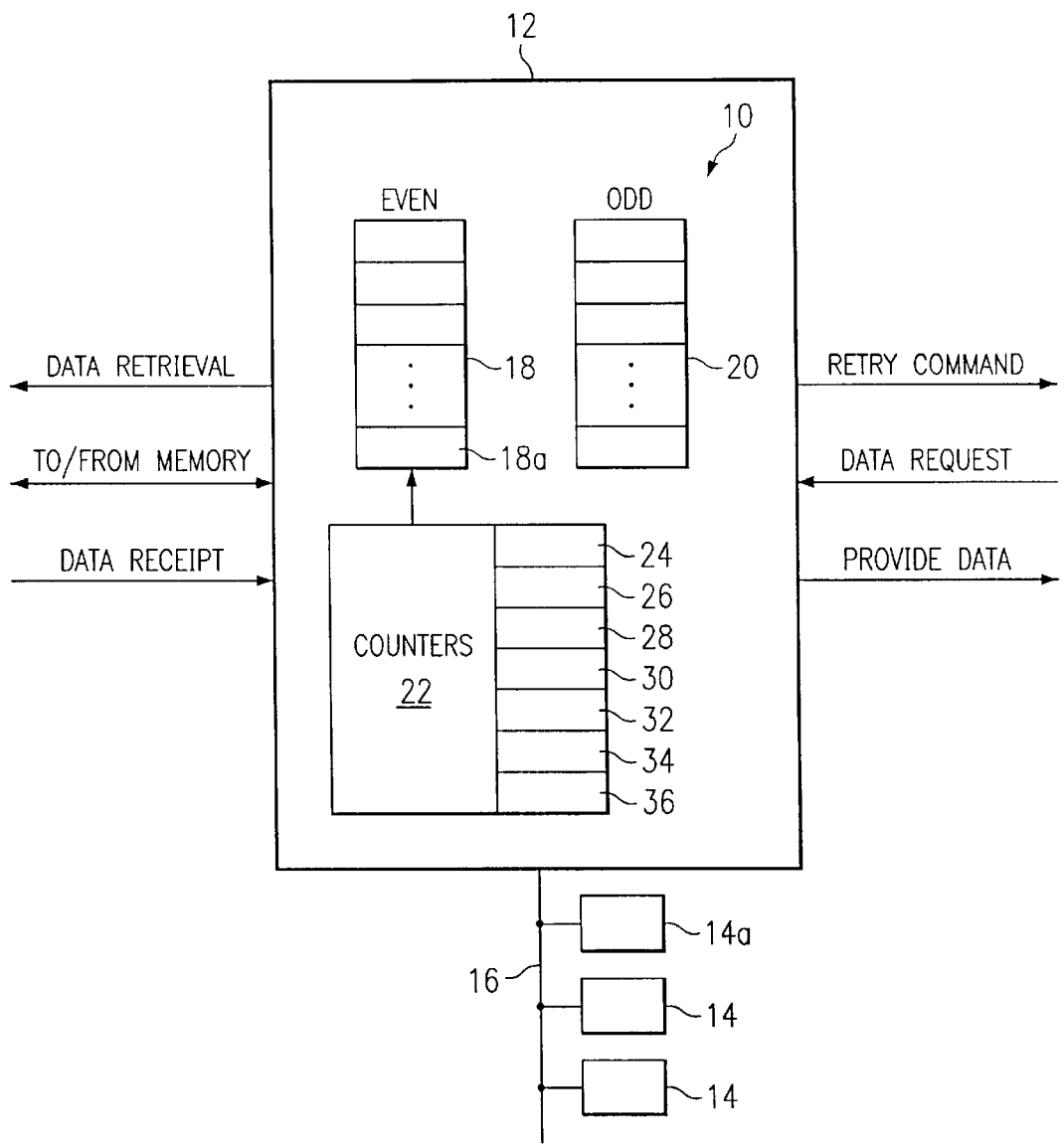

METHOD AND APPARATUS FOR ANALYZING BUFFER ALLOCATION TO A DEVICE ON A PERIPHERAL COMPONENT INTERCONNECT BUS

TECHNICAL FIELD OF THE INVENTION

The present invention relates in general to memory access in a computer system and more particularly to a method and apparatus for analyzing buffer allocation to a device on a peripheral component interconnect bus.

BACKGROUND OF THE INVENTION

In large computer systems, input/output access to memory has higher latency than a simple computer architecture for which a peripheral component interconnect bus was intended. This latency is due to the computer system having several memory subsystems connected via an interconnect network which requires some amount of time to traverse. Memory latency is dependent on the amount of hardware between the input/output subsystem and the memory subsystem. In most computer systems, memory is accessed in cache line units and is quantized or packetized to these units. Peripheral component interconnect bus implementations do not packetize its operation but expect that the bus has sole access to memory. By having sole access to memory, packetization of data is not required because any cache operations can be processed directly. Bandwidth falls short for fiber channel and other high bandwidth devices with only a single request in flight. Multiple requests in flight are needed for any given burst from the peripheral component interconnect bus. Since the peripheral component interconnect bus does not provide any indication as to the size of a transfer, the system input/output hardware must speculate on the access and pre-fetch of data ahead of the most current access and thus minimize the latency of sequential requests. Speculation requires additional system hardware resources and generates additional memory accesses, both adding to the total cost of the computer system. Therefore, it is desirable to optimize the amount of speculation that must be performed in accessing memory.

SUMMARY OF THE INVENTION

From the foregoing, it may be appreciated that a need has arisen for a technique to analyze allocation of resources in a computer system in order to optimize speculation required to access memory. In accordance with the present invention, a method and apparatus for analyzing buffer allocation to a device on a peripheral component interconnect bus are provided that substantially eliminate or reduce disadvantages and problems associated with conventional memory access techniques in a computer system.

According to an embodiment of the present invention, there is provided a method of analyzing buffer allocation to a device on a peripheral component interconnect bus that includes receiving a request for data from the device. A check is made to a buffer to determine whether the data is present. If not present, the data is retrieved from memory and includes retrieving speculative data pre-fetched in anticipation of its use by the device. Retry commands are issued to the device, causing the device to re-request the data, until requested data is received in the buffer. A first counter is incremented each time data in the buffer is provided to the device. A second counter is incremented each time data in the buffer is not accessed by the device. A third counter is periodically incremented upon initiating retrieval of the data until the data is received in the buffer from the memory. The third counter determines a retrieval latency for all requests made by the device and an average retrieval latency may be determined from the first, second, and third counters.

The present invention provides various technical advantages over conventional memory access techniques. For example, one technical advantage is to analyze buffer usage in a computer system. Another technical advantage is to adjust the allocation of a buffer in response to measured usage parameters. Yet another technical advantage is to optimize memory access speculation without introducing additional hardware into the computer system. Still another technical advantage is to adjust pre-fetch depth for memory retrievals. Other technical advantages may be readily apparent to those skilled in the art from the following figure, description, and claims.

DESCRIPTION OF THE DRAWINGS

The FIGURE illustrates a block diagram of a computer system that measures usage of allocated buffers.

DETAILED DESCRIPTION OF THE INVENTION

Operation of an exemplary computer system is shown and discussed in U.S. Pat. No. 5,915,104 which is hereby incorporated herein by reference. U.S. Pat. No. 5,915,104 discloses a capability to pre-fetch data from memory in response to a read operation generated in response to a device on a peripheral component interconnect (PCI) bus. Read response buffers are allocated to a PCI device so that read operations can be performed. The present invention expands on the disclosure of U.S. Pat. No. 5,915,104 by providing a technique to analyze read response buffer usage in order to determine an efficient allocation of read response buffers to a PCI device.

FIG. 1 is a block diagram of read response buffers 10 in a bridge device 12 connected to PCI devices 14 by a PCI bus 16. In operation, a particular PCI device 14a issues a request for data to bridge device 12. Bridge device 12 receives the request and determines if the requested data is available in a read response buffer 10. If so, the requested data is provided to PCI device 14a. If not, bridge device 12 issues a retry command to PCI device 14a. The retry command causes PCI device 14a to re-request the data. Bridge device 12 proceeds to retrieve the requested data and any pre-fetch data from memory. Upon receiving the requested data and the prefetch data, bridge device 12 places the retrieved data and the pre-fetch data into appropriate read response buffers 10. The requested data is provided to PCI device 14a in response to a re-request therefrom.

Read response buffers 10 are split into an even group 18 and an odd group 20. Even group 18 supports PCI devices 14 connected to even number PCI bus 16 slots. Odd group 20 supports PCI devices connected to odd number PCI bus 16 slots. Each buffer in even group 18 is associated with a plurality of counters/registers 22. Depending on design requirements, each buffer in odd group 20 may or may not be associated with a plurality of counters/registers 22. Counters/registers 22 are used to measure the usage activity of buffers in even group 18 in order to determine an efficient allocation of read response buffers 10 to a particular PCI device 14.

Counters/registers 22 may be used to measure certain usage parameters of an associated read response buffer 10a. For example, a first counter 24 may be used to determine a number of times that data stored within read response buffer 10a is provided to a requesting PCI device 14a. A second counter 26 may be used to determine a number of times that data stored within read response buffer 10a was not provided or needed by the requesting PCI device 14a. The combination of first counter 24 and second counter 26 provide a number of requests for data made by PCI device 14a. A third counter 28 provides an indication of how long it takes for bridge device 12 to retrieve data from memory for all retrievals. An average time in flight per retrieval may be determined according to the values in first counter 24, second counter 26, and third counter 28.

Counters/registers 22 may also include a fourth counter 30 that keeps track of the number of times that read response buffer 10a receives pre-fetch data. A fifth counter 32 holds the total number of re-requests performed by PCI device 14a for all addresses of requested data awaiting to be stored in read response buffer 10a. A sixth counter 34 may be used to store a maximum number of re-requests performed by PCI device 14a for any one particular address. For example, PCI device 14a requests data at a first address. The data from the first address is retrieved from memory by bridge device 12. PCI device 14a continues to re-request the data at the first address until the data is received at read response buffer 10a and provided to PCI device 14a. Sixth counter 34 keeps track of the number of re-requests made. This number is compared to a previous maximum number of re-requests. Being the first request made by PCI device 14a, the number determined by sixth counter 34 is stored therein. PCI device 14a performs a subsequent request for data at a second address. The number of re-requests made for the data at the second address is determined and compared to the number in sixth counter 34. If the new number is higher, it replaces the number in sixth counter 34. Otherwise, sixth counter 34 retains its value.

Similarly, a seventh counter 36 may be used to store a maximum time in flight between retrieving data from memory and receiving the data in read response buffer 10a for any particular retrieval instance. Seventh counter 36 keeps track of the time in flight for each retrieval operation from memory. Seventh counter 36 compares a time in flight for a retrieval operation to a maximum time In flight stored therein. Seventh counter 36 stores the higher value in response to the comparison.

Thus, it is apparent that there has been provided, in accordance with the present invention, a method and apparatus for analyzing buffer allocation for a device on a peripheral component interconnect bus that satisfies the advantages set forth above. Although the present invention has been described in detail, it should be understood that various changes, substitutions, and alterations may be made herein. For example, bridge device 12 may employ other counters to measure other parameters involved in retrieving data from memory and allocating buffers to PCI devices. Other examples may be readily ascertainable by those skilled in the art and may be made herein without departing from the spirit and scope of the present invention as defined by the following claims.

What is claimed is:

1. A method of analyzing buffer allocation for a device on a peripheral component interconnect bus, comprising:

receiving a request for data from the device;

determining whether the data is present in a buffer group;

retrieving the data from memory in response to the data not being present in the buffer group;

issuing retry commands to the device until data is received in the buffer group, each retry command causing the device to re-request the data;

receiving data in the buffer group from memory;

transferring the data to the device;

incrementing a first counter associated with a first buffer in the buffer group in response to a data transfer from the first buffer to the device;

incrementing a second counter associated with the first buffer in response to the request being for data stored in a second buffer of the buffer group;

periodically incrementing a third counter associated with the first buffer upon receiving the request until the data is received in the buffer group from the memory, the third counter determining a memory retrieval latency for the request.

2. The method of claim 1, further comprising:

determining an average time in flight per retrieval in response to values in the first, second, and third counters.

3. The method of claim 1, further comprising:

determining whether the data received in the first buffer was directly requested by the device or prefetched as a result of the request;

incrementing a fourth counter associated with the first buffer in response to a prefetch transfer of data from memory to the first buffer.

4. The method of claim 1, further comprising:

receiving a re-request for the data from the device;

incrementing a fifth counter associated with the first buffer in response to the re-request.

5. The method of claim 4, further comprising:

storing a maximum number of re-requests from the device in a sixth counter associated with the first buffer.

6. The method of claim 1, further comprising:

storing a maximum memory retrieval latency in a seventh counter associated with the first buffer.

7. The method of claim 6, further comprising:

allocating the first buffer in response to a comparison of the maximum memory retrieval latency of the seventh counter with the memory retrieval latency of the third counter.

8. The method of claim 1, further comprising:

adjusting allocation of the first buffer in response to the values in the first, second, and third counters.

9. The method of claim 1, further comprising:

flushing the data from the first buffer;

clearing the first, second, and third counters associated with the first buffer in response to flushing the first buffer.

10. The method of claim 1, further comprising:

storing in the first buffer data from memory not requested by the device in anticipation of the device requesting the data.

11. An apparatus for analyzing buffer allocation for a device on a peripheral component interconnect bus, comprising:

a buffer operable to receive data retrieved from a memory in response to a request from an input/output device;

a plurality of counters operable to measure usage parameters of the buffer, the usage parameters including a number of times data is provided to the device from the buffer, a number of times data stored in the buffer is not requested by the device, and an amount of time between a request from the device and receipt of the data at the buffer.

12. The apparatus of claim 11, wherein an allocation of the buffer to the device is adjusted in response to the measured usage parameters.

13. The apparatus of claim 11, wherein the plurality of counters includes a first counter that is incremented when data is provided to the device from the buffer, a second counter that is incremented when the request is for data stored in another buffer, and a third counter that is periodically incremented during retrieval of requested data.

14. The apparatus of claim 13, wherein the plurality of counters includes a fourth counter that is incremented when prefetched data is received in the buffer.

15. The apparatus of claim 14, wherein the plurality of counters includes a fifth counter that stores a maximum memory retrieval latency.

\* \* \* \* \*